US011330398B2

(12) United States Patent
Sakhalkar et al.

(10) Patent No.: US 11,330,398 B2
(45) Date of Patent: May 10, 2022

(54) METHOD AND SYSTEM FOR DETERMINING A SUSPECT DATA SOURCE IN A LOCATION BASED SERVICES NETWORK

(71) Applicant: InMobi, PTE Ltd., Singapore (SG)

(72) Inventors: Ameya Shrinivas Sakhalkar, Pune (IN); Raghunath Thondanur Mandayam, Bangalore (IN)

(73) Assignee: INMOBI, PTE LTD., Singapore (SG)

( * ) Notice: Subject to any disclaimer, the term of this patent is extended or adjusted under 35 U.S.C. 154(b) by 0 days.

(21) Appl. No.: 16/203,446

(22) Filed: Nov. 28, 2018

(65) Prior Publication Data

US 2019/0166465 A1    May 30, 2019

(30) Foreign Application Priority Data

Nov. 29, 2017    (IN) .............................. 201741042811

(51) Int. Cl.
  *H04W 64/00*  (2009.01)
  *H04W 4/02*  (2018.01)
  *H04W 4/029*  (2018.01)
  *G06F 16/29*  (2019.01)

(52) U.S. Cl.
  CPC ........... *H04W 4/029* (2018.02); *H04W 4/027* (2013.01); *H04W 64/006* (2013.01); *G06F 16/29* (2019.01)

(58) Field of Classification Search
  CPC ....... G06F 16/29; H04W 4/027; H04W 4/029; H04W 64/006; H04W 12/1202; H04W 4/02; G01S 19/14; G01S 19/396; G01S 1/00
  See application file for complete search history.

(56) References Cited

U.S. PATENT DOCUMENTS

| 8,792,909 | B1* | 7/2014 | Xu ......................... H04W 4/02 455/456.1 |
| 2008/0133336 | A1 | 6/2008 | Altman et al. |
| 2013/0046636 | A1 | 2/2013 | Asanke |
| 2013/0326607 | A1* | 12/2013 | Feng ....................... H04L 63/10 726/7 |
| 2014/0058730 | A1* | 2/2014 | Costa ..................... G06Q 50/10 704/235 |
| 2018/0139232 | A1* | 5/2018 | Bar Av ................. H04L 63/107 |

* cited by examiner

*Primary Examiner* — Kevin C. Harper
*Assistant Examiner* — Derrick V Rose

(57) ABSTRACT

A method and system for determining a suspected data source among one or more data sources reporting geo coordinate data in a location based services network is disclosed. In some embodiments, the method includes, receiving geo coordinates of a user device reported by the one or more data sources over a period of time, calculating a notional speed between geo coordinates reported at two consecutive times, flagging simultaneously, one or more data sources that reported the geo coordinates at the two consecutive times resulting in a notional speed that exceeds a predefined notional speed, and analysing a data on at least one of, the number of instances of geo coordinates reported by a data source, the number of instances a data source was flagged, the data sources that were also flagged simultaneously with each flagging, for determining the suspect source of data.

17 Claims, 5 Drawing Sheets

METHOD AND SYSTEM FOR DETERMINING A SUSPECT DATA SOURCE IN A LOCATION BASED SERVICES NETWORK

BACKGROUND

Field

The present disclosure relates to determining quality and accuracy of geo-location data and more particularly relates to a method and system for determining a suspect data source in a location based services network.

Description of the Related Art

Advertisement is a form of marketing communication generally used to promote or sell something, usually a business' product, services or both. Generally, advertisements are designed by an advertising agency for an identified sponsor, performed through variety of mass media including but not limited to smartphones, televisions, radios and other display means to reach the targeted audience or consumers. Advertising continues to be one of the major driving factors used to generate revenue by product manufactures, service providers, content providers and network operators. Among various kinds of mass media advertising, mobile advertising is a form of advertising via the mobile phones or other mobile devices such as tablets, personal digital assistants, etc.

In many markets of the world, mobile phones outnumber televisions sets, computer based internet users and the total laptop and desktop population, and advertisers in many markets have rushed into mobile advertising. People who use mobile phones often keep them nearby throughout the day and check their mobile phones regularly. Hence the advertisers may reach potential customers wherever they are instead of having to wait until they log on to the internet with a computer or watch television. Further, mobile advertising follows the people wherever they go and does not depend on any single location and hence provides extended access to the potential customers. A particularly powerful criteria for targeting the advertisements is geographic location. However, identifying the correct location of the users or audience to present the right advertisement at the right time is often desirable for the advertisers and to the ad network that generates revenue from the advertisements.

Typically, an advertiser is a person or a company who owns and advertises a product or a service. Advertisers often pay an ad network for advertising their products or services on mobile devices of the end users or audience. In turn, the ad network serves the advertisements in the form of, for example, textual, audio, and/or graphical data content. The ad network serves the advertisements to the end user devices through one or more publishers (entities serving content on websites, mobile applications, etc.) and the publisher receives compensation for serving the contents to the end users. Generally, the publisher requests an advertisement to be delivered to devices by the ad server, and the request includes a publisher identifier, geo-location data (e.g. location coordinates for delivery), IP address, etc. In response to the ad request, the ad server serves the content to the end user device.

However, the ad network faces challenges relating to the quality and accuracy of geo-location data received from the publishers. There can be a substantial degree of anomalies in the geo-location data received from the publishers over the ad network and the geo-location to which ad content is delivered. Such anomalies are typically a function of either inadvertent integration issues or potentially an error committed by the publishers or ad aggregators. For example, certain publishers may geocode the IP address of the target device's internet connection and pass the geocoded IP address as the target device's actual location to the ad server when a more precise location is unavailable. Typically, large numbers of IP addresses are mapped to a single location and hence result in that single location being reported for several end users. Hence, an enormous amount of effort and resources may be wasted on advertisements presented to the end users devices for whom the advertisements are ineffective or irrelevant.

Often the quantity of geo-locations referenced in a geo-location data set is relatively large, for example, thousands of time-stamped geo-location coordinates for millions of end user devices. Some of the conventional methods to detect anomalies in geo-location include discarding the locations having three or fewer decimal points in both the latitude and longitude, for example, locations having (12.94, 77.68) latitude and longitude data. Further methods include discarding the locations with highly improbable geo-location coordinates, discarding the locations having invalid latitude and/or longitude values and discarding the locations having co-ordinates from middle of oceans. For example, null island, that is latitude and longitude being (0, 0) is discarded assuming to be a coding or data collection error. Typically, valid values for latitude are between −90 and 90, and valid values for longitude are between −180 and 180. Locations reported with either latitude, longitude, or both having invalid values are discarded. Another commonly known approach is to divide the world map into equal sized small tiles (for example, 100 m×100 m) and measuring the density of ad requests per tile. Tiles having a density above a pre-set threshold level are marked as hotspots, and the publishers having significant contribution to those tiles are identified as the source of fraudulent or erroneous locations.

Evaluating the quality and accuracy of geo-location data received from the publishers using above said methods is erroneous, time consuming and expensive. Further, manually plotting the geo-locations and evaluating accuracy and quality with human reviewers is cumbersome, slow, and expensive to the point of not being practical with relatively large data sets.

SUMMARY OF THE DISCLOSURE

Thus, there exists a need for a system and method which mitigates at least some of the disadvantages of the state of the art.

This summary is provided to introduce a selection of concepts in a simple manner that are further described in the detailed description of the disclosure. This summary is not intended to identify key or essential inventive concepts of the subject matter nor is it intended for determining the scope of the disclosure.

A method and system for determining a suspect data source among one or more data sources reporting geo coordinate data in a location based services network is disclosed. In some embodiments of the present disclosure, the method includes receiving geo coordinates of a user device reported by the one or more data sources over a period of time, calculating a notional speed between geo coordinates reported at two consecutive times, flagging simultaneously, one or more data sources that reported the geo coordinates at the two consecutive times resulting in a notional speed that exceeds a predefined notional speed, and analysing data on at least one of, the number of instances of geo coordinates reported by a data source, the number of instances a data source was flagged, the data sources that were also flagged simultaneously with each flagging, for determining the suspect source of data. Further, determining the suspected data source among the one or more data sources includes, identifying a data source which has been flagged simultaneously at least a predefined number of times with each of at least a predefined number of data sources having an error rate greater than a predefined percentage of the number of instances the data source was flagged to the number of instances of geo coordinates reported by the data source.

BRIEF DESCRIPTION OF THE FIGURES

The disclosure will be described and explained with additional specificity and detail with the accompanying figures in which.

Further, persons skilled in the art to which this disclosure belongs will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DETAILED DESCRIPTION OF THE EXEMPLARY EMBODIMENTS

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in detail with reference to the accompanying figures.

The embodiments herein disclose a method and system for determining a suspect data source among one or more data sources reporting geo coordinate data in a location based services network. The term "location based services network" as described herein refers to a network service that uses end user location data for various purposes such as targeting advertisements, recommendations, etc. and the "data sources" as described herein refers to location data providers such as publishers, device manufacturers, operating systems, etc.

Figure 1:
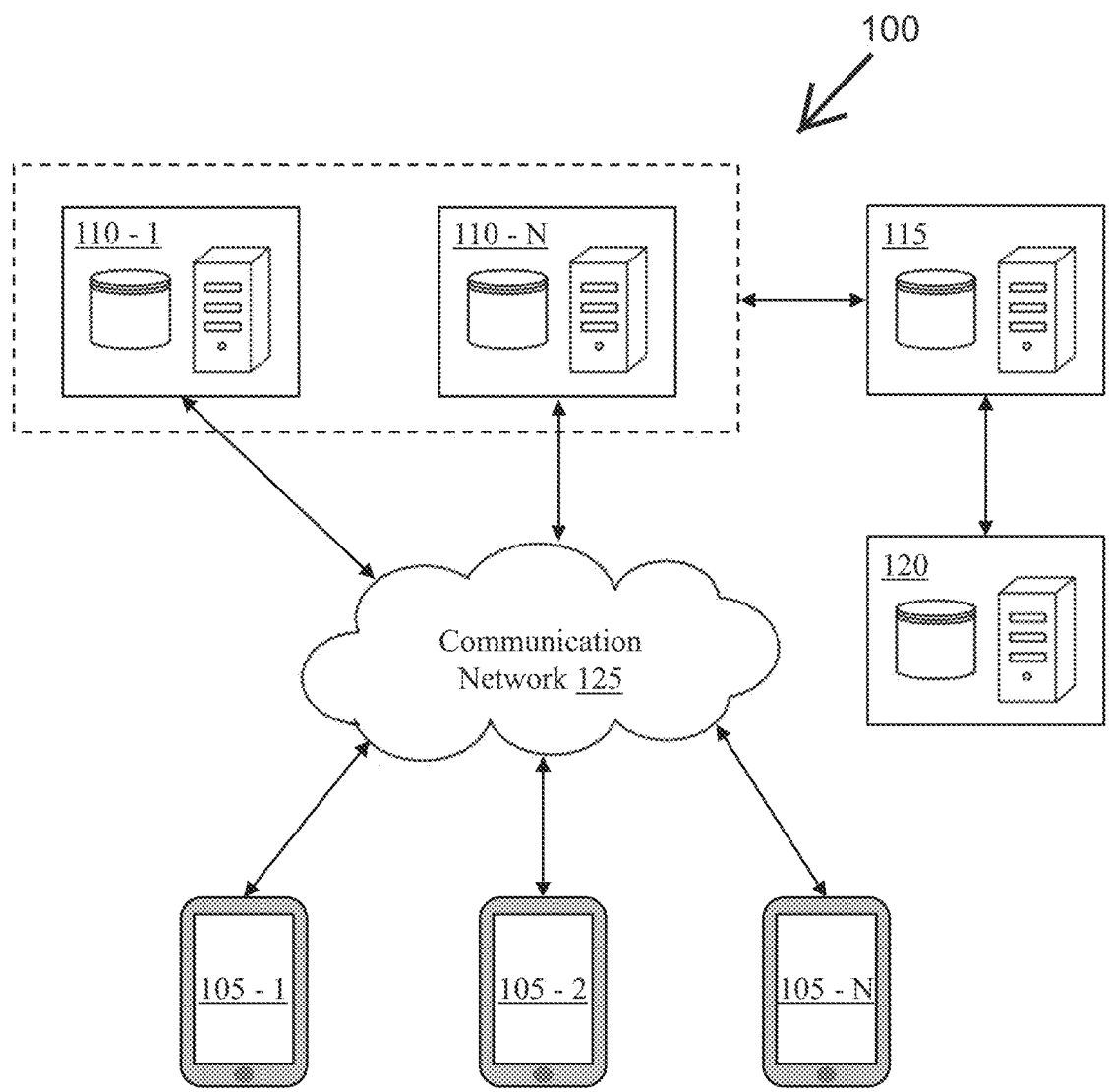
FIG. 1 illustrates an advertisement network, an exemplary location based service network, in which various embodiments of the present disclosure may be seen.

FIG. 1 illustrates an advertisement network, an exemplary location based service network, in which various embodiments of the present disclosure may be seen. As shown, the advertisement network (ad network) 100 includes plurality of user devices 105-1 to 105-N (hereafter referred as user device 105), one or more publisher servers 110-1 to 110-N (hereafter referred as data source server 110), an ad network server 115 and an advertisement asset server 120 (ad asset server), wherein the one or more publisher servers 110 and the plurality of user devices 105 are communicatively connected through a communication network 125.

The user device 105 may include one of a smartphone, a notebook computer, a personal data assistant (PDA), and other mobile, network connected devices preferably having positioning capability (e.g. a global positioning system (GPS) or other location identifying system), capable of connecting to the internet or other communication network, and having other communication capabilities. Typically, the user device 105 includes one or more native and/or third party applications provided by the one or more publishers (data sources), wherein the applications may include but are not limited to games, social networking applications, e-commerce applications, web applications, utility applications, educational, business and entertainment applications, etc. One or more publishers provide ad spaces where the ad network may push one or more advertisements by matching the ad space from the publishers with demand from the advertisers. Further, the one or more publishers track the user location and the user location information is provided to the ad network for targeting advertisements. In other words, the one or more publishers track the user location based on at least one of GPS co-ordinates of the user device, IP address of the user device, mobile tower triangulation etc. and generate an ad request. The ad request is communicated to the ad network for pushing the advertisement. Hence, the one or more publishers herein are referred as data sources, which provide geo coordinate data/location data to the ad network/advertising agency.

Referring to FIG. 1, the one or more data source servers 110 track the user device 105 locations and generate an ad request, wherein the ad request includes geo coordinate data of the user device 105 along with user device identifier, publisher identifier, IP address of the user device 105, ad space information, etc. The ad request is then communicated to the ad network server 115. In response to the ad request, the ad network server 115 serves the content (advertisements) from the ad asset server 120 to the user device 105.

However, such ad requests received from the one or more data sources may contain erroneous data such as for example, erroneous geo-coordinate data by virtue of historical anomalies, coding errors or fraudulent activities. Hence, a method for determining a suspect data source among the one or more data sources reporting geo coordinate data in the location based services network is disclosed.

In one embodiment of the present disclosure, the ad network server 115 is configured for determining the one or more suspect data sources by analysing the geo coordinate data, wherein the geo coordinate data includes geo location coordinates (latitude and longitude values) along with the time at which the location was determined and the user device ID. In another embodiment of the present disclosure, the ad network server 115 is further configured for determining a suspect data source among one or more data sources reporting geo coordinate data based on the accuracy of the geo coordinate data (plurality of location records) reported by the one or more data source servers 110.

Accordingly, in one embodiment of the present disclosure, a method for determining a suspect data source among one or more data sources reporting geo coordinate data in a location based services network includes, receiving geo coordinates of a user device reported by the one or more data sources over a period of time, calculating a notional speed between geo coordinates reported at two consecutive times, flagging simultaneously, one or more data sources that reported the geo coordinates at the two consecutive times resulting in a notional speed that exceeds a predefined notional speed, and analysing a data on at least one of, the number of instances of geo coordinates reported by a data source, the number of instances a data source was flagged, the data sources that were also flagged simultaneously with each flagging, for determining the suspect source of data. Further, determining the suspected data source among the one or more data sources includes, identifying a data source which has been flagged simultaneously at least a predefined number of times with each of at least a predefined number of data sources having an error rate greater than a predefined percentage of the number of instances the data source was flagged to the number of instances of geo coordinates reported by the data source.

As described, "the one or more data sources" refers to one or more location data/geo coordinate data providers for example, one or more publishers and "suspected data source" as described herein refers to a erroneous geo coordinate data providers. The erroneous geo coordinate data may be a function of either inadvertent integration issues or a deliberate fraud committed by the one or more data sources, for example one or more publishers. The manner in which a suspect data source is identified among one or more data sources reporting geo coordinate data in a location based services network is described in detail further below.

Figure 2:
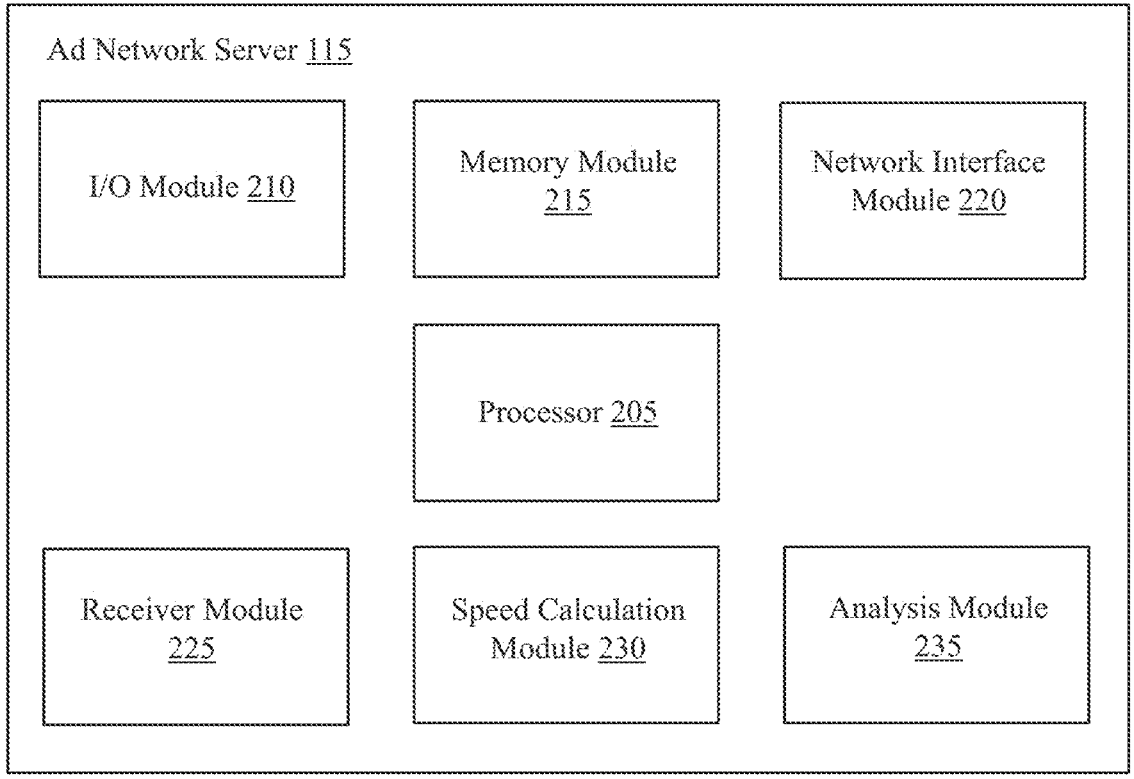
FIG. 2 is an exemplary block diagram of the ad network server implemented for determining a suspected data source in an ad network in accordance with an embodiment of the present disclosure.

FIG. 2 is an exemplary block diagram of the ad network server implemented for determining a suspected data source in an ad network in accordance with an embodiment of the present disclosure. The functionality is shown organized in discrete functional modules for purposes of explaining the software and hardware by which the ad network server 115 may be implemented. It has to be noted that such hardware and software may be conjoined, subdivided, replicated, or otherwise differently arranged relative to the illustrated functional modules. Further, the ad network server 115 may be implemented on one or more computing devices based on the requirements, such as based on the data set to be processed, time and cost and other constraints.

It will be appreciated by those skilled in the art that the ad network server 115 includes one or more processors 205 for processing data, an input/output module 210 enabling user interaction with the system, one or more memory module 215 for instructions and data storage, and other known functional modules such as interface module 220 enabling communication between the ad network and the one or more publisher servers 110-1 to 110-N.

In one implementation, the ad network server 115 further includes a receiver module 225, a speed calculation module 230 and an analysis module 235 as shown. The receiver module 225 receives plurality of ad requests from the one or more data source servers (110-1 to 110-N), wherein the ad request includes geo coordinates of the one or more user devices along with the time at which the location was determined, user device IDs, data source identifiers (publisher IDs), ad space information, etc. Upon receiving the plurality of ad requests from one or more data sources, the receiver module 225 decodes each of the ad requests to identify the geo coordinates associated with the ad requests and plots the geo coordinates of each of the user devices (reported by the one or more data sources) over a period of time. That is, for each distinct user device (device ID), the receiver module 225 sorts all geo coordinates in ascending order of time, received from all the data sources.

For example, considering single user device 105 and one or more data sources (publishers), the receiver module 225 receives the geo coordinates of the user device 105 reported by the one or more data sources over a period of time, for example 1 day, and plots the geo coordinates against the time.

Figure 3:
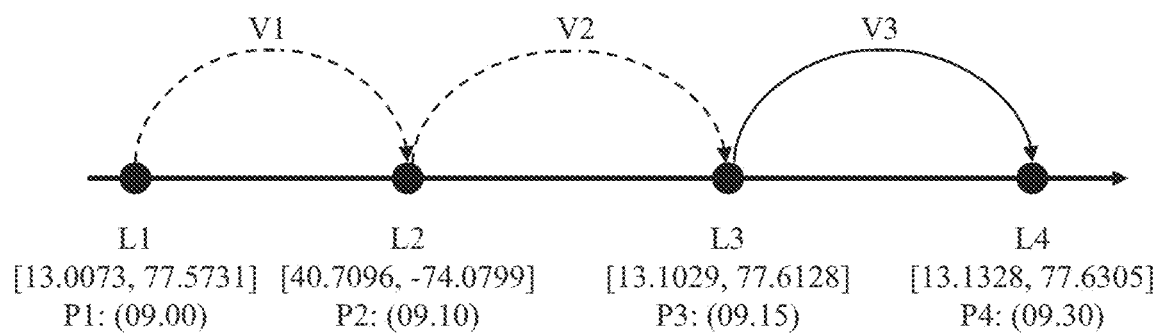
FIG. 3 illustrates graphical representation of geo coordinates plotting against the time in accordance with an embodiment of the present disclosure.

FIG. 3 illustrates graphical representation of geo coordinates plotting against the time in accordance with an embodiment of the present disclosure. In the FIG. 3, distinct locations are represented in terms of latitude and longitude values along with the data source identifier and the time of the day at which geo coordinates/locations was reported. For ease of understanding, all the locations were assumed to have been reported on the same day. As illustrated, first location L1[13.0073, 77.5731] is reported by a publisher "P1" at "9.00", second location L2[40.7096, −74.0799] is reported by a publisher "P2" at "9.10", third location L3[13.1029, 77.6128] is reported by publisher "P3" at time "9.15" and the fourth location L4[13.1328, 77.6305] is reported by publisher "P4" at time "9.30".

Then, the speed calculation module 230 calculates a notional speed between the geo coordinates reported at two consecutive times. That is, the speed calculation module 230 calculates a notional speed between each pair of geo coordinates reported by the one or more data sources at two consecutive time instances. Considering a pair of geo coordinates being (L1, L2) with the corresponding consecutive reporting time being (T1, T2), then the notional speed is, $$\text{Notional Speed} = \text{abs}(\text{distance}(L2-L1)/(T2-T1))$$

The term "notional speed" as described herein is a speed between any two geo coordinates reported at two consecutive time instances by the one or more data sources. The notional speed equals the actual speed of the user device if the user device has travelled an aerial distance equal to the difference between the two geo coordinates reported at two consecutive time instances. Referring to FIG. 3, the speed calculation module 230 calculates notional speed between each pair of geo coordinates reported at consecutive time instances. That is, the speed calculation module 230 calculates notional speed V1 between L1 and L2, V2 between L2 and L3, and V3 between L3 and L4 as shown. Similarly, the speed calculation module 230 calculates the notional speed between each pair of geo coordinates at consecutive time instances for all the user devices for which the geo coordinates were reported by the one or more data sources (publishers).

Referring back to FIG. 2, upon calculating the notional speed between each pair of geo coordinates at consecutive time instances, the analysis module 235 flags simultaneously, one or more data sources that reported the geo coordinates at the two consecutive times resulting in a notional speed that exceeds a predefined notional speed (a pre-defined threshold notional speed). That is, upon calculating the notional speed between a pair of geo coordinates at consecutive time instances, for example V1 between L1 and L2, the analysis module 235 compares the notional speed V1 with the predefined notional speed (Vt), wherein the predefined notional speed may be 50 m/s, for example. If the notional speed V1 exceeds the predefined notional speed (Vt), then the analysis module 235 flags both the data sources P1 and P2 reporting both L1 and L2 as suspicious geo coordinates. If a single data source for example P1 reported both L1 and L2, then the data source P1 is flagged two times (one for L1 and L2 each). It has to be noted that the "pre-defined notional speed" is domain dependent and may be defined based on the requirement of analysis.

Similarly, the analysis module 235 compares notional speed between each pair of geo coordinates at consecutive time instances for all the user devices for which the geo coordinates were reported by the one or more data sources (publishers) and flags the one or more data sources simultaneously if the notional speed exceeds the predefined notion speed. The term "flagging" as described herein refers to counting the number of times each data source reported suspicious geo coordinates and in one embodiment the flagging process may be implemented by initializing a counter for each one of the data sources.

Figure 4:
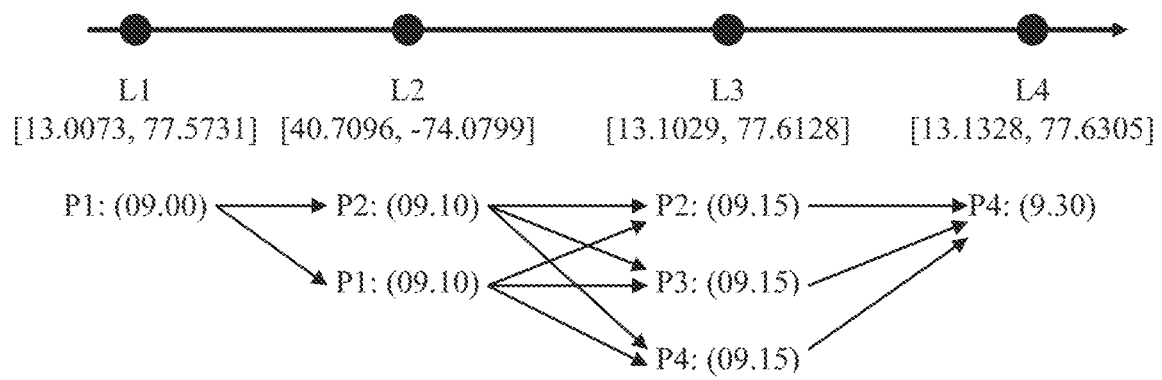
FIG. 4 illustrates another exemplary graphical representation of geo coordinates plotting in accordance with an embodiment of the present disclosure.

FIG. 4 illustrates another exemplary graphical representation of geo coordinates plotting in accordance with an embodiment of the present disclosure. As illustrated, data source P2 reported location L2 at time 9.10 and the data source P1 reported location L1 at time 9.00 and L2 at 9.10. In such a scenario, the speed calculation module 230 calculates the notional speed between L1 and L2 for the data sources P1 and P2, and if it exceeds the predefined notional speed, then the analysis module 235 flags both the data sources P1 and P2. Further, the speed calculation module 230 calculates the notional speed between L1 and L2 for the data source P1, and if it exceeds the predefined notional speed, then the analysis module 235 flags the data source P1 two times.

Further, as illustrated, at time 9.15, data sources P2, P3 and P4 reported location L3. In such a scenario, the notional speed between L2 and L3 is calculated for the data source pair P2 and P2, P2 and P3, P2 and P4, and if the notional speed exceeds the predefined notional speed, then the pair of data sources are flagged simultaneously. The arrow marks indicates notional speed calculation between one or more pairs of the data sources.

In one embodiment of the present disclosure, upon flagging the one or more data sources that reported suspicious geo coordinates at the two consecutive times, the analysis module 235 analyses a data on at least one of, the number of instances of geo coordinates reported by a data source, the number of instances a data source was flagged, the data sources that were also flagged simultaneously with each flagging, for determining the suspect data source. Further, the analysis module 235 determines the suspect data source by identifying a data source which has been flagged simultaneously at least a predefined number of times with each of at least a predefined number of data sources having an error rate greater than a predefined percentage of the number of instances the data source was flagged to the number of instances of geo coordinates reported by the data source.

In one embodiment, different approaches may be implemented by the analysis module 235 to perform the analysis on the flagged data sources for determining one or more suspect data sources. One approach, in accordance with an embodiment of the present disclosure involves generating a weighted graph. In other words, the one or more device locations (geo coordinates) reported by the one or more data sources are modelled as a weighted graph and the weighted graph is analysed for determining the one or more suspicious data sources.

Alternatively, in one embodiment of the present disclosure, an algorithm may be implemented by the analysis module 235 for flagging the one or more data sources and performing analysis on the flagged data sources for determining the one or more suspect data sources. In such implementation, the geo coordinates received from the one or more data source servers along with the time instances of reporting the geo coordinates, user device IDs, publisher IDs etc. are recorded in a database. Further, the algorithm may be executed on the data recorder in the database for flagging the one or more data sources that reported the geo coordinates at the two consecutive times resulting in a notional speed that exceeds a predefined notional speed; and analysing a data on at least one of, the number of instances of geo coordinates reported by a data source, the number of instances a data source was flagged, the data sources that were also flagged simultaneously with each flagging, for determining the suspect source of data.

However, for ease of understanding and illustration, the weighted graph approach for determining the one or more suspect data source is described herein. The manner in which the weighted graph is generated and analysed for determining one or more suspect data sources is described in detail further below.

Figure 5:
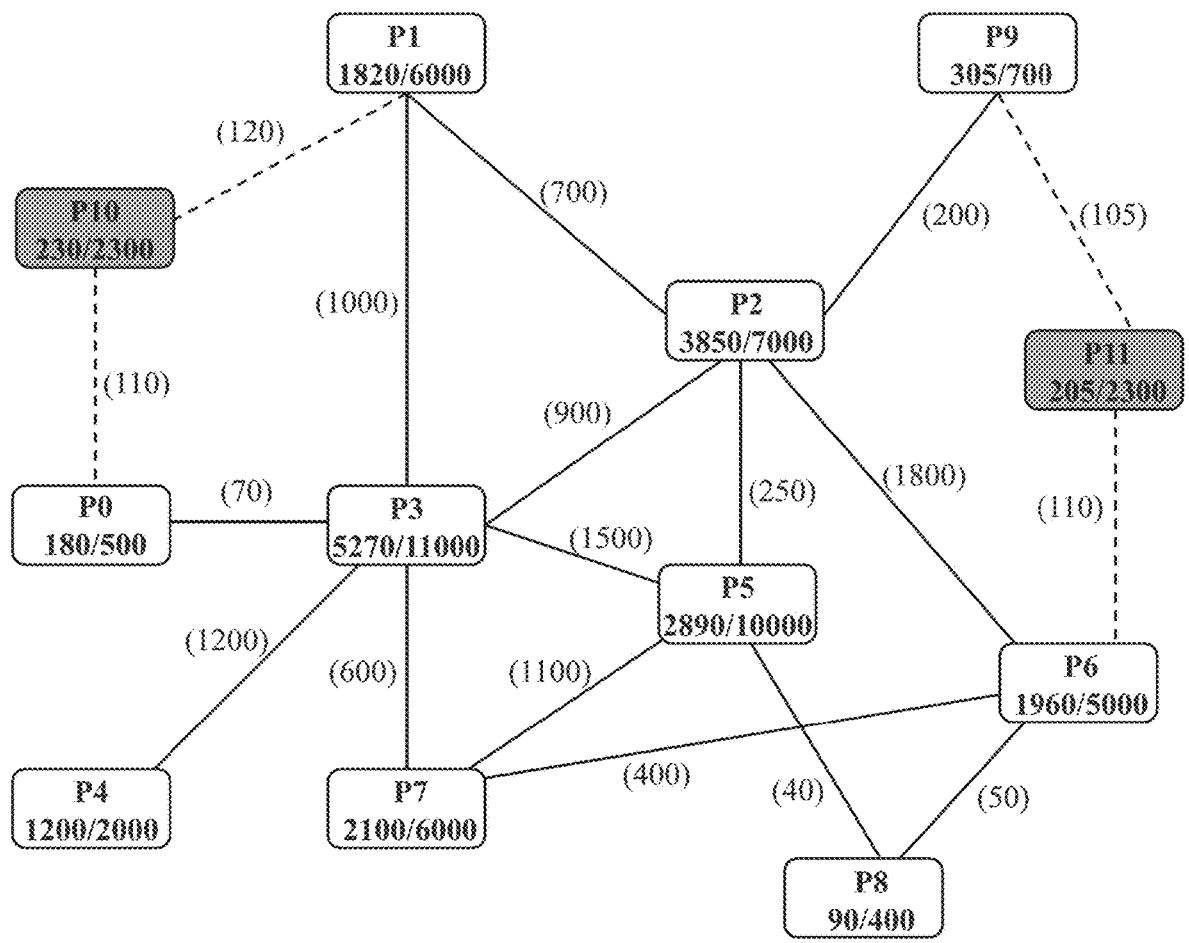
FIG. 5 illustrates an example weighted graph for determining one or more suspect data sources in accordance with an embodiment of the present disclosure.

FIG. 5 illustrates an example weighted graph for determining one or more suspect data sources in accordance with an embodiment of the present disclosure. As shown, the weighted graph includes nodes P0 to P11 (represented by rectangular boxes) representing the flagged data sources (P0 to P11) and an edge is constructed for each pair of nodes that were flagged simultaneously, wherein the edges are represented by connecting lines between the pair of nodes. Further, an edge weight is assigned to each edge, wherein the edge weight represents the number of times the two nodes are flagged together/simultaneously. For example, an edge between the nodes P0 and P3 indicates that the two data sources P0 and P3 are 70 times flagged simultaneously. In other words, the edge and the edge weight indicate that the data sources P0 and P3 reported the geo coordinates 70 times at the two consecutive times resulting in a notional speed that exceeded the predefined notional speed. Further, a ratio indicated at each node represents the number of instances that particular data source was flagged to the number of instances of geo coordinates reported by that particular data source. In other words, the ratio represents the total number of times a data source was flagged to the total number of times the data source reported the geo coordinates. Hence, the ratio provides an error rate of a data source. Referring to FIG. 5, a ratio at node P1 indicates that the node P1 is flagged 1820 times and it reported the geo coordinates 6000 times over a period of time, for example 1 day. Hence, the error rate of the data source P1 is approximately 30.33%.

As described, the weighted graph includes plurality of nodes representing the one or more data sources, edges representing pair of data sources that were flagged simultaneously, and an edge weight on each node representing the number of times the pair of data sources was flagged together. Thus generated weighted graph is analysed for determining one or more suspect data sources. In some embodiments, weighted graph may be constructed for different types of data sources, for example, one weighted graph for publishers, another weighted graph for device manufacturers, etc. Such implementation helps to determine one or more suspect data sources (poor quality data sources) from each type of data sources independently.

Initially, in one embodiment of the present disclosure, the nodes (representing data sources) having an error rate less than or equal to a pre-defined error rate (threshold error rate defined by an administrator/user of the system) are pruned. Further, edges of such nodes are pruned. In the present example, considering 20% pre-defined error rate, the nodes P10 and P11 and their corresponding edges are pruned. The pruned nodes are highlighted in grey and the edges are highlighted in dotted lines for illustration purposes.

Figure 6:
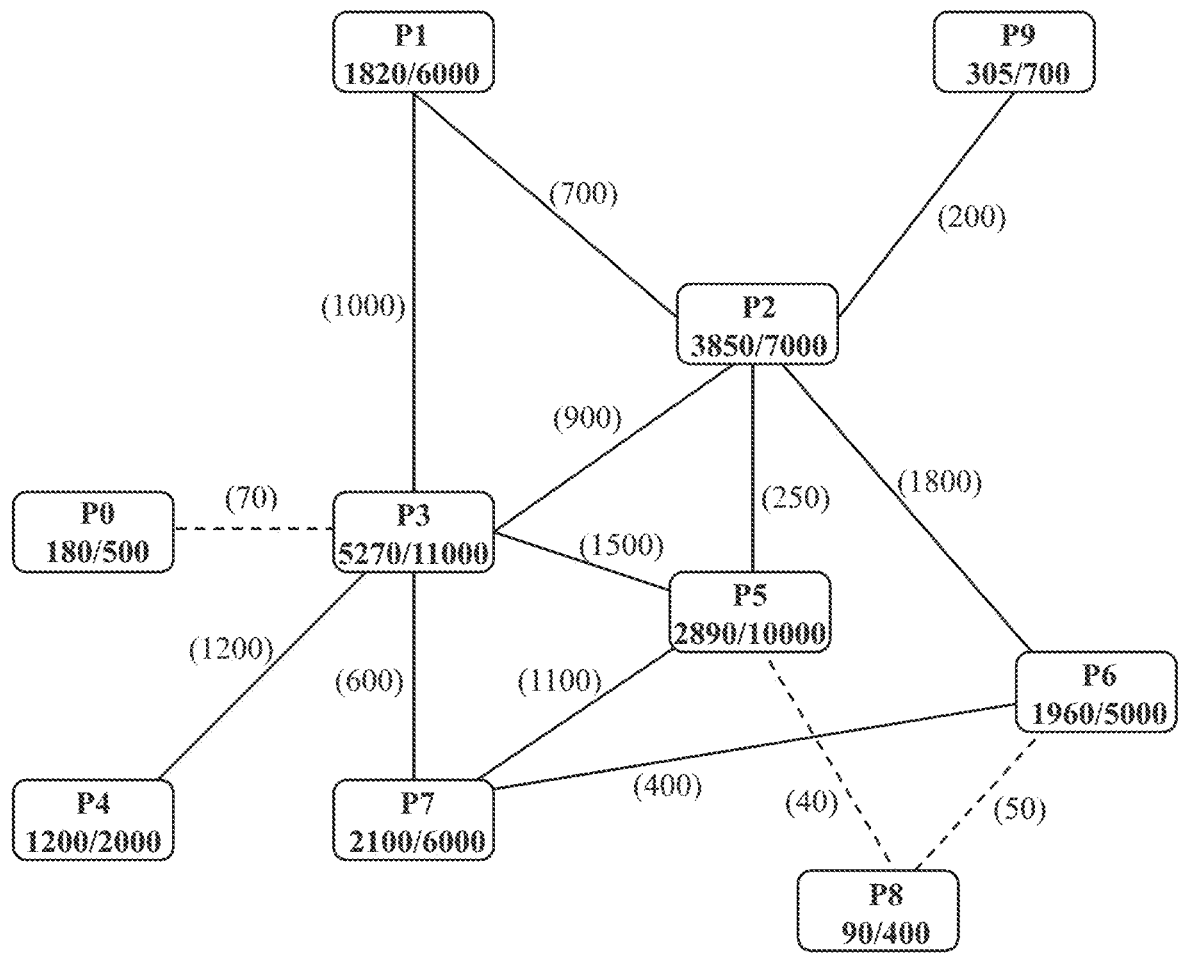
FIG. 6 illustrates an exemplary resultant weighted graph in accordance with an embodiment of the present disclosure.

FIG. 6 illustrates an exemplary resultant weighted graph in accordance with an embodiment of the present disclosure. As shown, the resultant weighted graph includes nodes P0 to P9 and the resultant weighted graph is further analysed for determining the one or more suspect data sources. In one embodiment of the present disclosure, the edges having an edge weight less than a pre-defined edge weight are pruned. In one implementation, considering the pre-defined edge weight as "100", the edges having edge weight less the "100" are pruned. That is, the edges connecting the pair of nodes that are flagged simultaneously less than "100" times are pruned from the resultant weighted graph. For example, referring to FIG. 6, the edge having an edge weight "70" connecting the node P0 and P3 is pruned. Similarly, the edge having edge weight "40" connecting the nodes P5 and P8, and the edge having edge weight "50" connecting the nodes P6 and P8 are pruned from the resultant weighted graph.

Further, in the remaining (potentially disjoint) resultant weighted graph, the number of edges per each node are calculated and compared with a pre-defined number of edges (per each node). Then the nodes having number of edges less than the pre-defined number of edges are pruned from the resultant graph and the remaining one or nodes (having number of edges greater than or equal to the pre-defined number of edges) are marked as suspect data sources providing erroneous geo coordinates. Referring to FIG. 6, considering "4" as the pre-defined number of edges, the nodes P0, P4, P5, P6, P7, P8 and P9 are pruned from the resultant weighted graph. The nodes P2 and P3 having "5" edges, representing the data source P2 and P3 respectively, are marked as suspicious data sources in the given network, over the period of time. In one embodiment of the present disclosure, the said process is iterated over a multiple period of times (for example, 1 day, 3 days, 1 week, 1 month, etc.) for determining one or more suspicious data sources or inaccurate location data providers.

Hence, the method and system disclosed in the present disclosure may be implemented for determining one or more suspect data sources among one or more data sources reporting geo coordinate data in a location based services network is disclosed. For example, an advertising agency/an ad network may implement the disclosed system and method for identifying the one or more publishers reporting the erroneous location data of the end user devices. The disclosed system and method utilizes the geo coordinate data of the plurality of end user devices reported by the one or more publishers over a period of time. Such geo coordinate data along with the time at which the location was determined, the user device IDs, and the publisher IDs are analysed for identifying the one or more suspicious publishers.

Further, the system and method disclosed in the present disclosure may be leveraged for determining other types of poor quality location sources such as IP addresses and mobile device models, without any modification to the core concept.

The pre-defined values or the threshold values mentioned in the present disclosure are arbitrary values, and the same are considered for illustrative purpose only. However, choice of any other values for such pre-defined values doesn't affect the basics of the disclosure.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A method for operating a computing system to determine a suspect, geo location reporting data source among one or more data sources reporting geo coordinate data in a location based services network, the method comprising:
   (a) utilizing a receiver module, receiving geo coordinates of a user device reported by the one or more data sources over a period of time;
   (b) utilizing a speed calculation module, calculating a notional speed between geo coordinates reported at two consecutive times;
   (c) utilizing an analysis module, flagging, simultaneously, one or more data sources that reported the geo coordinates at the two consecutive times resulting in a notional speed that exceeds a predefined notional speed;
   (d) for each of the one or more data sources that are flagged, utilizing the analysis module, analyzing data on a number of instances of geo coordinates reported by the data source, a number of instances data source was flagged, each additional data that were also flagged simultaneously, wherein the analyzing data comprises generating a weighted graph, and generating a weighted graph comprises:
   modelling geo coordinates as the weighted graph, wherein the weighted graph includes:

nodes representing flagged data sources; and
edges between flagged data source;
assigning an edge weight to each edge, wherein the edge weight represents a number of times pairs of data sources connected by the edges are flagged together and simultaneously, wherein a ratio indicated at each node represents a number of instances that a particular data source was flagged to the number of instances of geo coordinates reported by that particular data source, wherein the ratio provides an error rate of each flagged data source; and
pruning nodes and edges from the graph whose error rate is less than or equal to a pre-defined error rate; and
(e) determining the suspect source of data from the analyzing to improve accuracy of geo location data of user devices.

2. The method as claimed in claim 1, wherein determining the suspect data source comprises:
identifying a data source which has been flagged simultaneously at least a predefined number of times with each of at least a predefined number of data sources having an error rate greater than a predefined percentage of the number of instances the data source was flagged to the number of instances of geo coordinates reported by the data source.

3. A system for determining a suspect, geo location reporting data source among one or more data sources reporting geo coordinate data in a location based services network, the system comprising:
a processor; and
a memory storing geo coordinates of a user device reported by the one or more data sources over a period of time and storing modules that are executable by the processor, wherein the modules comprise;
a speed calculation module configured to calculate a notional speed between geo coordinates reported at two consecutive times; and
an analysis module configured to:
flag, simultaneously, one or more data sources that reported the geo coordinates at the two consecutive times resulting in a notional speed that exceeds a predefined notional speed;
for each of the one or more data sources that are flagged, analyze data a number of instances of geo coordinates reported by the data source, a number of instances the data source was flagged, each one of the data sources that was also flagged simultaneously, wherein to analyze data comprises to generate a weighted graph, and to generate a weighted graph comprises to:
model geo coordinates as the weighted graph, wherein the weighted graph includes:
nodes representing flagged data sources; and
edges between flagged data sources;
assign an edge weight to each edge, wherein the edge weight represents a number of times pairs of data sources connected by the edges are flagged together and simultaneously, wherein a ratio indicated at each node represents a number of instances that a particular data source was flagged to the number of instances of geo coordinates reported by that particular data source, wherein the ratio provides an error rate of each flagged data source; and
prune nodes and edges from the graph whose error rate is less than or equal to a pre-defined error rate; and
determine the suspect source of data from the analyzing to improve accuracy of geo location data of user devices.

4. The method of claim 1 wherein flagging one or more data sources that reported the geo coordinates at the two consecutive times resulting in a notional speed that exceeds a predefined notional speed comprises:
simultaneously flagging multiple data sources that reported the geo coordinates at the two consecutive times resulting in the notional speed that exceeds the predefined notional speed.

5. The method of claim 1 further comprising:
repeating (a)-(e) for sets of geo coordinates that are impractically large for a human reviewer to process.

6. The method of claim 1 wherein the receiving geo coordinates further comprises:
receiving a plurality of ad requests from the data sources, wherein each of the ad requests includes the geo coordinates of multiple user devices along with a time at which the geo coordinates were determined, user device identifiers, data source identifiers, and ad space information.

7. The method of claim 6 further comprising:
utilizing the receiver module:
upon receiving the plurality of ad requests from one or more data sources, decoding each of the ad requests to identify the geo coordinates associated with the ad requests and plot the geo coordinates of each of the user devices over a period of time;
for each distinct user device, sorting all geo coordinates in ascending order of time received from all the data sources; and
utilizing the speed calculation module:
determining the notional speed using:

$$\text{Notional Speed} = \text{abs}(\text{distance}(L2-L1)/(T2-T1)),$$

wherein:
(L1, L2) are geo coordinates for the user device corresponding to reporting times (T1, T2).

8. The system as claimed in claim 3, wherein to determine the suspect data source the analysis module is further configured to:
identify a data source which has been flagged simultaneously at least a predefined number of times with each of at least a predefined number of data sources having an error rate greater than a predefined percentage of the number of instances the data source was flagged to the number of instances of geo coordinates reported by the data source.

9. The system of claim 3 wherein to flag one or more data sources that reported the geo coordinates at the two consecutive times resulting in a notional speed that exceeds a predefined notional speed comprises to:
flag multiple data sources that reported the geo coordinates at the two consecutive times resulting in the notional speed that exceeds the predefined notional speed.

10. The system of claim 3 wherein the speed calculation module and analysis module are configured to process sets of geo coordinates that are impractically large for a human reviewer to process.

11. The system of claim 3 wherein the memory further stores a plurality of ad requests from the data sources, wherein each of the ad requests includes the geo coordinates of multiple user devices along with a time at which the geo coordinates were determined, user device identifiers, data source identifiers, and ad space information.

12. The system of claim 11 wherein:
the memory further includes code executable by the processor to cause the processor to:
decode each of the ad requests to identify the geo coordinates associated with the ad requests and plot the geo coordinates of each of the user devices over a period of time; and
for each distinct user device, sort all geo coordinates in ascending order of time received from all the data sources; and
the speed calculation module is further configured to determine the notional speed using:

Notional Speed=abs(distance($L2-L1$)/($T2-T1$)),
wherein:

($L1$, $L2$) are geo coordinates for the user device corresponding to reporting times ($T1$, $T2$).

13. A non-transitory, computer program product comprising code stored therein to cause a computing system to determine a suspect, geo location reporting data source among one or more data sources reporting geo coordinate data in a location based services network, wherein the code is executable to:
receive geo coordinates of a user device reported by the one or more data sources over a period of time;
implement a speed calculation module configured to calculate a notional speed between geo coordinates reported at two consecutive times; and
implement an analysis module configured to:
flag, simultaneously, one or more data sources that reported the geo coordinates at the two consecutive times resulting in a notional speed that exceeds a predefined notional speed;
for each of the one or more data sources that are flagged, analyze data a number of instances of geo coordinates reported by the data source, a number of instances the data source was flagged, each one of the data sources that was also flagged simultaneously, wherein to analyze data comprises to generate a weighted graph, and to generate a weighted graph comprises to:
model geo coordinates as the weighted graph, wherein the weighted graph includes:
nodes representing flagged data sources; and
edges between flagged data sources;
assign an edge weight to each edge, wherein the edge weight represents a number of times pairs of data sources connected by the edges are flagged together and simultaneously, wherein a ratio indicated at each node represents a number of instances that a particular data source was flagged to the number of instances of geo coordinates reported by that particular data source, wherein the ratio provides an error rate of each flagged data source; and
prune nodes and edges from the graph whose error rate is less than or equal to a pre-defined error rate; and
determine the suspect source of data from the analyzing to improve accuracy of geo location data of user devices.

14. The computer program product as claimed in claim 13, wherein to determine the suspect data source the analysis module is further configured to:
identify a data source which has been flagged simultaneously at least a predefined number of times with each of at least a predefined number of data sources having an error rate greater than a predefined percentage of the number of instances the data source was flagged to the number of instances of geo coordinates reported by the data source.

15. The computer program product of claim 13 wherein to flag one or more data sources that reported the geo coordinates at the two consecutive times resulting in a notional speed that exceeds a predefined notional speed comprises to:
flag multiple data sources that reported the geo coordinates at the two consecutive times resulting in the notional speed that exceeds the predefined notional speed.

16. The computer program product of claim 13 wherein the speed calculation module and analysis module are configured to process sets of geo coordinates that are impractically large for a human reviewer to process.

17. The computer program product of claim 13 wherein:
the memory further includes code executable by the processor to cause the processor to:
decode each of the ad requests to identify the geo coordinates associated with the ad requests and plot the geo coordinates of each of the user devices over a period of time; and
for each distinct user device, sort all geo coordinates in ascending order of time received from all the data sources; and
the speed calculation module is further configured to determine the notional speed using:

Notional Speed=abs(distance($L2-L1$)/($T2-T1$)),
wherein:

($L1$, $L2$) are geo coordinates for the user device corresponding to reporting times ($T1$, $T2$).

* * * * *